US012559026B2

(12) United States Patent
Park et al.

(10) Patent No.: US 12,559,026 B2
(45) Date of Patent: Feb. 24, 2026

(54) VEHICLE AND CONTROL METHOD THEREOF

(71) Applicants: HYUNDAI MOTOR COMPANY, Seoul (KR); KIA CORPORATION, Seoul (KR)

(72) Inventors: Sung Soo Park, Seoul (KR); Chang Woo Chun, Suwon-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 501 days.

(21) Appl. No.: 18/075,716

(22) Filed: Dec. 6, 2022

(65) Prior Publication Data

US 2023/0311757 A1 Oct. 5, 2023

(30) Foreign Application Priority Data

Mar. 30, 2022 (KR) ........................ 10-2022-0039477

(51) Int. Cl.
| | |
|---|---|
| *G10L 15/22* | (2006.01) |
| *B60K 35/10* | (2024.01) |
| *B60K 35/28* | (2024.01) |
| *B60K 35/80* | (2024.01) |
| *B60Q 9/00* | (2006.01) |
| *G06F 3/16* | (2006.01) |
| *G06F 40/30* | (2020.01) |
| *G10L 15/16* | (2006.01) |
| *G10L 15/18* | (2013.01) |
| *G10L 25/63* | (2013.01) |
| *B60K 35/22* | (2024.01) |
| *B60K 35/26* | (2024.01) |

(52) U.S. Cl.
CPC ................ *B60Q 9/00* (2013.01); *B60K 35/10* (2024.01); *B60K 35/28* (2024.01); *B60K 35/80* (2024.01); *G06F 3/167* (2013.01); *G06F 40/30* (2020.01); *G10L 15/16* (2013.01); *G10L 15/1815* (2013.01); *G10L 15/22* (2013.01); *G10L 25/63* (2013.01); *B60K 35/22* (2024.01); *B60K 35/265* (2024.01)

(58) Field of Classification Search
CPC .......... B60Q 9/00; G06F 3/167; G06F 40/30; G10L 15/16; G10L 15/1815; G10L 15/22; G10L 25/63
See application file for complete search history.

(56) References Cited

U.S. PATENT DOCUMENTS

| | | | | |
|---|---|---|---|---|
| 11,289,082 B1 * | 3/2022 | Lacy | ........................ | G10L 15/02 |
| 2014/0309893 A1 * | 10/2014 | Ricci | ................... | G07C 5/0833 |
| | | | | 701/1 |

(Continued)

*Primary Examiner* — Paras D Shah

(74) *Attorney, Agent, or Firm* — Morgan, Lewis & Bockius LLP

(57) ABSTRACT

A vehicle includes a user interface; and at least one processor configured to control the user interface, wherein the at least one processor is configured to: determine an intention of a speech of a driver and an emotion of the driver based on the driver's speech input through the user interface; determine vehicle status information based on a driving status and a warning light status; determine a dialogue processing scenario based on the intention of the driver's speech, the driver's emotion and the vehicle status information; and control to perform the dialogue processing scenario.

14 Claims, 14 Drawing Sheets

(56) References Cited

U.S. PATENT DOCUMENTS

| | | | |
|---|---|---|---|
| 2015/0276424 A1* | 10/2015 | Kwon | G10L 15/22 |
| | | | 704/275 |
| 2018/0314689 A1* | 11/2018 | Wang | G10L 15/1822 |
| 2019/0378515 A1* | 12/2019 | Kim | G10L 17/22 |
| 2020/0258514 A1* | 8/2020 | Park | G10L 15/22 |
| 2020/0388387 A1* | 12/2020 | Rebolledo Mendez | |
| | | | H04L 67/12 |
| 2021/0287697 A1* | 9/2021 | Marti | G10L 25/63 |

* cited by examiner

FIG. 3

| DIALOGUE SCENARIO | INTENTION | DESCRIPTION | SPEECH EXAMPLE |
|---|---|---|---|
| 0 | None | NO USER ACTION | NO SPEECH |
| 1 | Boring | DAILY DIALOGUE | "I AM BORED" |
| 1 | JOKE | DAILY DIALOGUE | "TELL ME SOMETHING FUNNY" |
| ⋮ | ⋮ | DAILY DIALOGUE | ⋮ |
| 2 | Diagnosis | VEHICLE STATUS CHECK | "DIAGNOSE VEHICLE" |
| 3 | Check_Status | VEHICLE STATUS CHECK | "LET ME KNOW STATUS OF MY CAR" |
| 4 | What_is | CHECKING WHAT WARNING LIGHT IS FOR | "WHAT IS WARNING LIGHT XXX?" |
| 5 | Check_List | CHECKING WHAT WARNING LIGHT IS FOR | "LET ME KNOW WHAT WARNING LIGHT IS FOR" |
| 6 | Why_TurnOn | CHECKING WHAT WARNING LIGHT IS FOR | "WHY IS WARNING LIGHT TURNED ON?" |
| 7 | Check_defect | DEFECT STATUS CHECK | "IS IT BROKEN?" |
| 8 | Find_defect | DEFECT STATUS CHECK | "MY CAR IS WEIRD" |

FIG. 4

| EXCITEMENT LEVEL | EMOTION CLASSIFICATION |
|---|---|
| 1 | CALM |
| 2 | UNCOMFORTABLE/ OFFENDED |
| 3 | ASTOUNDED |

FIG. 5

| DIALOGUE SCENARIO | INTENTION | EXCITEMENT LEVEL1 (CALM - BASIC OPERATION) | EXCITEMENT LEVEL2 (UNCOMFORTABLE/OFFENDED) | EXCITEMENT LEVEL3 (ASTOUNDED) |
|---|---|---|---|---|
| 0 | None | NO OPERATION | ← | ← |
| 1 | Chitchat | PERFORMING BASIC FUNCTION (DIALOGUE) OF SPEECH RECOGNITION | ← | ← |
| 2 | Diagnosis | NOTIFICATION OF VEHICLE DIAGNOSIS RESULT | ← | INCREASE ADDITIONAL NOTIFICATION COUNT VALUE BY 1 |
| 3 | Check_Status | NOTIFICATION OF VEHICLE DIAGNOSIS RESULT | ← | INCREASE ADDITIONAL NOTIFICATION COUNT VALUE BY 1 |
| 4 | What_is | IMAGE OF WARNING LIGHT | ← | ← |
| 5 | Check_List | LIST OF ENTIRE WARNING LIGHTS & WARNING LIGHT NOTIFICATION | ← | ← |
| 6 | Why_TurnOn | LIST OF WARNING LIGHTS ON & WARNING LIGHT NOTIFICATION | ← | INCREASE ADDITIONAL NOTIFICATION COUNT VALUE BY 1 |
| 7 | Check_defect | DEFECT NOTIFICATION | INCREASE ADDITIONAL NOTIFICATION COUNT VALUE BY 1 | INCREASE ADDITIONAL NOTIFICATION COUNT VALUE BY 2 |
| 8 | Find_defect | DEFECT NOTIFICATION | INCREASE ADDITIONAL NOTIFICATION COUNT VALUE BY 1 | INCREASE ADDITIONAL NOTIFICATION COUNT VALUE BY 2 |

FIG. 6

| RISK LEVEL OF WARNING LIGHT STATUS | WARNING LIGHT | | DIALOGUE PROCESSING SCENARIO |
|---|---|---|---|
| | WARNING LIGHT | IRRELEVANT | |
| 1 | GREEN LIGHT | | - |
| 2 | ORANGE WARNING LIGHT | ABOVE 2 | INCREASE ADDITIONAL NOTIFICATION COUNT VALUE BY 1 |
| 3 | ORANGE WARNING LIGHT | ABOVE 2 | INCREASE ADDITIONAL NOTIFICATION COUNT VALUE BY 1 |
| 4 | RED WARNING LIGHT | ABOVE 1 | INCREASE ADDITIONAL NOTIFICATION COUNT VALUE BY 2 |

FIG. 7

| DRIVING RISK LEVEL | DRIVING STATUS | | DIALOGUE PROCESSING SCENARIO |
|---|---|---|---|
| 1 | STOPPED | | – |
| 2 | STOPPED | + EMERGENCY LIGHT | INCREASE ADDITIONAL NOTIFICATION COUNT VALUE BY 1 |
| 3 | DRIVING | | INCREASE ADDITIONAL NOTIFICATION COUNT VALUE BY 1 |
| 4 | DRIVING | + EMERGENCY LIGHT | INCREASE ADDITIONAL NOTIFICATION COUNT VALUE BY 2 |

FIG. 8

| DIALOGUE PROCESSING SCENARIO | DIALOGUE SCENARIO | ADDITIONAL NOTIFICATION SCENARIO | | |
|---|---|---|---|---|
| | | SUM OF ADDITIONAL NOTIFICATION COUNTS = 1 | SUM OF ADDITIONAL NOTIFICATION COUNTS = 2 | SUM OF ADDITIONAL NOTIFICATION COUNTS = ABOVE 3 |
| 0 | NO OPERATION | WARNING POP-UP | + POP-UP ABOUT VEHICLE INSPECTION RESERVATION | + SOS CALL CONNECTION |
| 1 | PERFORMING BASIC FUNCTION (DIALOGUE) OF SPEECH RECOGNITION | + WARNING | + POP-UP ABOUT VEHICLE INSPECTION RESERVATION | + SOS CALL CONNECTION |
| 2 | NOTIFICATION OF VEHICLE DIAGNOSIS RESULT | + VEHICLE INSPECTION RESERVATION | + SOS CALL CONNECTION | + ROADSIDE ASSISTANCE CALL |
| 3 | | + VEHICLE INSPECTION RESERVATION | + SOS CALL CONNECTION | + ROADSIDE ASSISTANCE CALL |
| 4 | | + VEHICLE INSPECTION RESERVATION | + SOS CALL CONNECTION | + ROADSIDE ASSISTANCE CALL |
| 5 | WARNING LIGHT NOTIFICATION | + VEHICLE INSPECTION RESERVATION | + SOS CALL CONNECTION | + ROADSIDE ASSISTANCE CALL |
| 6 | | + VEHICLE INSPECTION RESERVATION | + SOS CALL CONNECTION | + ROADSIDE ASSISTANCE CALL |
| 7 | DEFECT NOTIFICATION | + SOS CALL CONNECTION | + ROADSIDE ASSISTANCE CALL | + EMERGENCY LIGHT ON AND WARNING |
| 8 | | + SOS CALL CONNECTION | + ROADSIDE ASSISTANCE CALL | + EMERGENCY LIGHT ON AND WARNING |

FIG. 9

EMERGENCY ASSISTANCE

1. NORMAL
2. CAUTION : VEHICLE
   INSPECTION RESERVATION
3. WARNING : VEHICLE INSPECTION
   + ROADSIDE ASSISTANCE CALL
4. EMERGENCY : SOS CALL
   + ROADSIDE ASSISTANCE CALL

Y : RISK CLASS OF
WARNING LIGHT(COLOR)

EMERGENCY

WARNING

CAUTION

NORMAL

Lv.5

Lv.4

Lv.3

Lv.2

Lv.1

X : EXCITEMENT
LEVEL OF DRIVER

NOTIFICATION FREQUENCY / CHANNEL
/ LEVEL OF DESCRIPTION

SIMPLE : SIMPLE NOTIFICATION DURING
         VOICE DIALOGUE (ONE TIME)
BASIC : DETAILED NOTIFICATION AS TO TROUBLE
        /TROUBLESHOOTING DURING VOICE DIALOGUE
        (ONE TIME) + SENDING E-MAIL (ONE TIME)
DETAILED : BASIC + SMS/PUSH NOTIFICATIONS
           WHEN VEHICLE IS TURNED OFF
SERIOUS : DETAILED + NOTIFYING EACH TIME
          VEHICLE IS TURNED ON
          (REPEATEDLY THREE TIMES)
          + CONNECTING WITH COUNSELOR

DIVERSIFICATION OF
NOTIFICATION MODE (MULTI-MODAL)

Lv.1 : DISPLAYING
       WARNING LIGHT LIST AND Q&A
Lv.2 : POP-UP NOTIFICATION
Lv.3 : Lv.2 + WARNING SOUND
Lv.4 : Lv.3 + HANDLE/SEAT VIBRATION
Lv.5 : Lv.4 + EMERGENCY LIGHT +
       + BLINKING CLUSTER
       WARNING LIGHT

Z : NUMBER OF WARNING LIGHTS ON
CUMULATIVE NUMBERS OF WARNING LIGHTS ON
REPETITION NUMBER OF USER QUERIES

FIG. 13
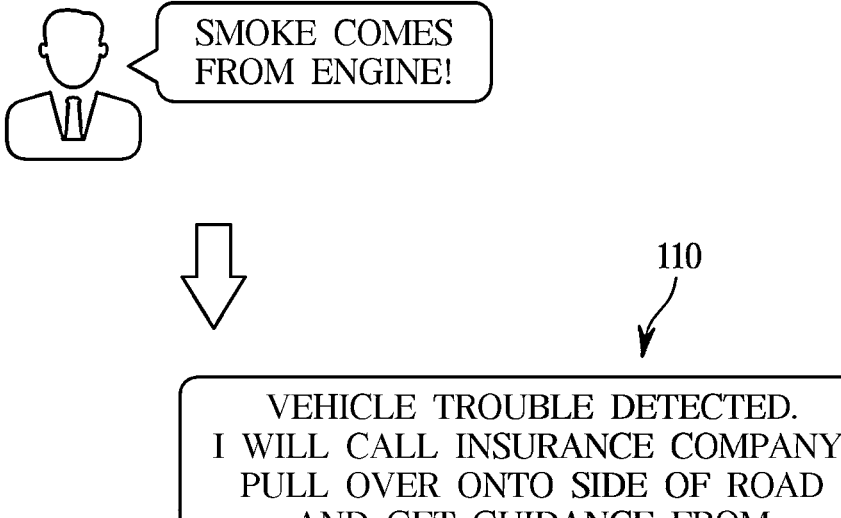
110
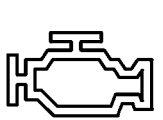

VEHICLE AND CONTROL METHOD THEREOF

CROSS-REFERENCE TO RELATED APPLICATION

This application is based on and claims priority under 35 U.S.C. § 119 to Korean Patent Application No. 10-2022-0039477, filed on Mar. 30, 2022 in the Korean Intellectual Property Office, the disclosure of which is incorporated herein by reference.

TECHNICAL FIELD

The disclosure relates to a vehicle and a control method thereof that may process a driver's speech.

BACKGROUND

Audio, video, navigation (AVN) units for vehicle or most mobile devices have small screens and buttons, causing inconvenience when a user checks visual information or makes an input.

In particular, taking driver's attention from driving or taking driver's hands off a steering wheel to check visual information or operate a device may threaten safe driving.

Accordingly, when a dialogue system that identifies a user intention and provides a user with a desired service through dialogues with the user is applied to a vehicle, it is expected to provide a service more conveniently and safely.

SUMMARY

An aspect of the disclosure provides a vehicle and a control method thereof that may, when processing a driver's speech and providing a dialogue processing scenario corresponding to the processed speech, determine the dialogue processing scenario by considering driver's emotions and a vehicle status, thereby providing an optimal dialogue processing scenario.

Additional aspects of the disclosure will be set forth in part in the description which follows and, in part, will be obvious from the description, or may be learned by practice of the disclosure.

According to an aspect of the disclosure, there is provided a vehicle including: a user interface; and at least one processor configured to control the user interface, wherein the at least one processor is configured to: determine an intention of a speech of a driver and an emotion of the driver based on the driver's speech input through the user interface; determine vehicle status information based on a driving status and a warning light status; determine a dialogue processing scenario based on the intention of the driver's speech, the driver's emotion and the vehicle status information; and control to perform the dialogue processing scenario.

The dialogue processing scenario includes a dialogue scenario corresponding to the intention of the driver's speech; and an additional notification scenario corresponding to the driver's emotion and the vehicle status information.

The at least one processor is configured to determine the additional notification scenario based on the dialogue scenario, an excitement level of the driver, a risk level of the warning light status and a driving risk level.

The at least one processor is configured to determine the intention of the driver's speech based on an output of a neural network for a text of the driver's speech, and determine the driver's emotion based on a speech waveform of the driver's speech.

The at least one processor is configured to control at least one of a notification mode, a notification frequency, a level of description or an emergency assistance level of the additional notification scenario to increase, as the excitement level of the driver increases.

The at least one processor is configured to determine the risk level of the warning light status based on a warning light color and a number of warning lights that are on, and control at least one of a notification mode, a notification frequency, a level of description or an emergency assistance level of the additional notification scenario to increase, as the risk level of the warning light status increases.

The at least one processor is configured to determine the driving risk level based on the driving status and whether an emergency light is on, and control at least one of a notification mode, a notification frequency, a level of description or an emergency assistance level of the additional notification scenario to increase, as the driving risk level increases.

The at least one processor is configured to determine the additional notification scenario, based on a sum of a first additional notification count value proportional to the excitement level of the driver, a second additional notification count value proportional to the risk level of the warning light status, and a third additional notification count value proportional to the driving risk level.

The at least one processor is configured to control at least one of a notification mode, a notification frequency, a level of description or an emergency assistance level of the additional notification scenario to increase, as the sum increases.

The additional notification scenario includes at least one of a warning voice message output, a vehicle inspection reservation, an SOS call connection, a roadside assistance call or an emergency light that is turned on.

According to an aspect of the disclosure, there is provided a method to control a vehicle including a user interface, the method including: determining, by at least one processor, an intention of a speech of a driver and an emotion of the driver based on the driver's speech input through the user interface; determining, by the at least one processor, vehicle status information based on a driving status and a warning light status; determining, by the at least one processor, a dialogue processing scenario based on the intention of the driver's speech, the driver's emotion and the vehicle status information; and controlling, by the at least one processor, the user interface to perform the dialogue processing scenario.

The dialogue processing scenario includes a dialogue scenario corresponding to the intention of the driver's speech; and an additional notification scenario corresponding to the driver's emotion and the vehicle status information.

The determining of the dialogue processing scenario includes determining, by the at least one processor, the additional notification scenario based on the dialogue scenario, an excitement level of the driver, a risk level of the warning light status and a driving risk level.

The determining of the intention of the driver's speech and the driver's emotion includes determining, by the at least one processor, the intention of the driver's speech based on an output of a neural network for a text of the driver's speech, and determining, by the at least one processor, the driver's emotion based on a speech waveform of the driver's speech.

The determining of the dialogue processing scenario includes controlling, by the at least one processor, at least one of a notification mode, a notification frequency, a level of description or an emergency assistance level of the additional notification scenario to increase, as the excitement level of the driver increases.

The determining of the dialogue processing scenario includes determining, by the at least one processor, the risk level of the warning light status based on a warning light color and a number of warning lights that are on, and controlling at least one of a notification mode, a notification frequency, a level of description or an emergency assistance level of the additional notification scenario to increase, as the risk level of the warning light status increases.

The determining of the dialogue processing scenario includes determining, by the at least one processor, the driving risk level based on the driving status and whether an emergency light is on, and controlling at least one of a notification mode, a notification frequency, a level of description or an emergency assistance level of the additional notification scenario to increase, as the driving risk level increases.

The determining of the dialogue processing scenario includes determining, by the at least one processor, the additional notification scenario, based on a sum of a first additional notification count value proportional to the excitement level of the driver, a second additional notification count value proportional to the risk level of the warning light status, and a third additional notification count value proportional to the driving risk level.

The determining of the dialogue processing scenario includes controlling, by the at least one processor, at least one of a notification mode, a notification frequency, a level of description or an emergency assistance level of the additional notification scenario to increase, as the sum increases.

The additional notification scenario includes at least one of a warning voice message output, a vehicle inspection reservation, an SOS call connection, a roadside assistance call or an emergency light that is turned on.

BRIEF DESCRIPTION OF THE DRAWINGS

These and/or other aspects of the disclosure will become apparent and more readily appreciated from the following description of the embodiments, taken in conjunction with the accompanying drawings of which:

FIG. 3 is a diagram illustrating an example where a vehicle according to an embodiment determines a driver's speech intention based on a driver's speech;

FIG. 4 is a diagram illustrating an example where a vehicle according to an embodiment determines a driver's emotion based on a driver's speech;

FIG. 5 is a diagram illustrating an example where a vehicle according to an embodiment performs a dialogue scenario and starts an operation;

FIG. 6 is a diagram illustrating an example where a vehicle according to an embodiment determines a risk level of a warning light status based on a warning light color and the number of warning lights that are on;

FIG. 7 is a diagram illustrating an example where a vehicle according to an embodiment determines a driving risk level based on a driving status;

FIG. 8 is a diagram illustrating an example where a vehicle according to an embodiment determines an additional notification scenario according to a sum of additional notification counts and a dialogue scenario;

FIG. 9 is a diagram illustrating an example where a vehicle according to an embodiment determines a dialogue processing scenario;

FIGS. 10 to 13 are diagrams illustrating examples where a vehicle according to an embodiment performs a dialogue processing scenario.

DETAILED DESCRIPTION

Figure 1:
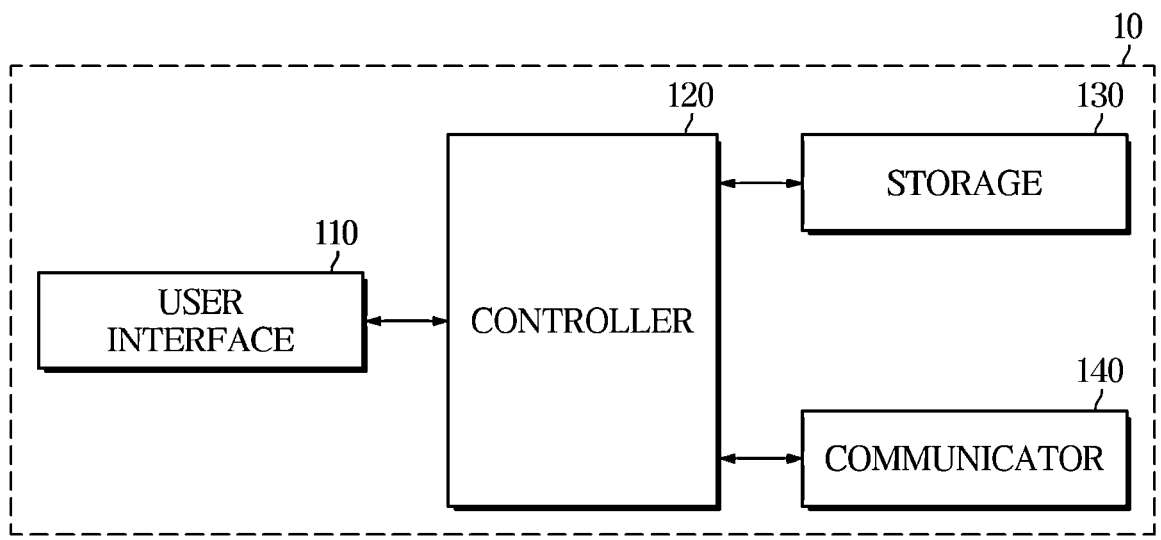
FIG. 1 is a control block diagram illustrating a vehicle according to an embodiment.

Like reference numerals throughout the specification denote like elements. Also, this specification does not describe all the elements according to embodiments of the disclosure, and descriptions well-known in the art to which the disclosure pertains or overlapped portions are omitted.

It will be understood that when an element is referred to as being "connected" to another element, it can be directly or indirectly connected to the other element, wherein the indirect connection includes "connection" via a wireless communication network.

It will be understood that the term "include" when used in this specification, specifies the presence of stated features, integers, steps, operations, elements, and/or components, but do not preclude the presence or addition of one or more other features, integers, steps, operations, elements, components, and/or groups thereof.

It is to be understood that the singular forms are intended to include the plural forms as well, unless the context clearly dictates otherwise.

The terms such as "processor", "~part", "~device", "~member", "~module", "~block", and the like may refer to a unit for processing at least one function or act. For example, the terms may refer to at least one hardware, such as field-programmable gate array (FPGA)/application specific integrated circuit (ASIC), processing at least one process or software stored in memories or processors.

Reference numerals used for method steps are just used for convenience of explanation, but not to limit an order of the steps. Thus, unless the context clearly dictates otherwise, the written order may be practiced otherwise.

Hereinafter, a vehicle and a control method thereof according to embodiments of the disclosure will be described in detail with reference to the accompanying drawings.

FIG. 1 is a control block diagram illustrating a vehicle according to an embodiment.

Referring to FIG. 1, a vehicle 10 according to an embodiment includes a user interface 110, a controller 120, a storage 130 and a communicator 140. Here, the controller 120 determines a dialogue processing scenario by processing a driver's speech and controls to perform the dialogue processing scenario, the storage 130 stores various data, and the communicator 140 performs communication with an external electronic device.

According to an embodiment, the user interface 110 may receive a driver's speech, output a response voice and display information, in response to the driver's speech.

To this end, the user interface 110 may include at least one of a microphone, a speaker, or a display, each of which may be a known type of device.

According to an embodiment, the controller 120 may control the user interface 110. That is, the controller 120 may receive the driver's speech, input through the user interface 110, determine the dialogue processing scenario corresponding to the driver's speech, and control various configurations of the vehicle 10 including the user interface 110 to perform the dialogue processing scenario.

According to an embodiment, the controller 120 may determine an intention of the driver's speech and a driver's emotion based on the driver's speech input through the user interface 110. In this instance, the driver's emotion may indicate an excitement level of the driver.

Also, according to an embodiment, the controller 120 may determine vehicle status information based on at least one of a warning light status or a driving status. In this instance, the vehicle status information may indicate a risk level of current status of the vehicle 10.

According to an embodiment, the controller 120 may determine the dialogue processing scenario based on the intention of the driver's speech, the driver's emotion and the vehicle status information, and control to perform the dialogue processing scenario.

In this instance, the dialogue processing scenario may include a dialogue scenario corresponding to the intention of the driver's speech, and an additional notification scenario corresponding to the driver's emotion and the vehicle status information.

The dialogue scenario may be a speech scenario for response to the intention of the driver's speech, and the additional notification scenario may be a scenario for additionally informing a vehicle status by further considering the driver's emotion and the vehicle status information.

For example, the additional notification scenario may include at least one of a warning voice message output, a vehicle inspection reservation, an SOS call connection, a roadside assistance call or an emergency light on (an emergency light that is turned on).

In this instance, according to embodiments, the controller 120 may determine the additional notification scenario based on at least one of the dialogue scenario, the excitement level of the driver, a risk level of the warning light status, or a driving risk level.

That is, according to embodiments, the controller 120 may determine the intention of the driver's speech based on an output of a neural network for a text of the driver's speech, and determine the driver's emotion based on a speech waveform of the driver's speech. Also, as the excitement level of the driver increases, the controller 120 may control at least one of a notification mode, a notification frequency, a level of description or an emergency assistance level of the additional notification scenario to increase.

Also, according to embodiments, the controller 120 may determine the risk level of the warning light status based on a warning light color and the number of warning lights that are on, and as the risk level of the warning light status increases, control at least one of a notification mode, a notification frequency, a level of description or an emergency assistance level of the additional notification scenario to increase.

In addition, according to embodiments, the controller 120 may determine the driving risk level based on the driving status and whether an emergency light is on, and as the driving risk level increases, control at least one of a notification mode, a notification frequency, a level of description or an emergency assistance level of the additional notification scenario to increase.

For example, the controller 120 may determine the additional notification scenario, based on a sum of a first additional notification count value proportional to the excitement level of the driver, a second additional notification count value proportional to the risk level of the warning light status, and a third additional notification count value proportional to the driving risk level.

Specifically, as the sum of count values increases, the controller 120 may control at least one of a notification mode, a notification frequency, a level of description or an emergency assistance level of the additional notification scenario to increase.

In addition to the above-described operations of the controller 120, the controller 120 may control overall operations of the vehicle 10. For example, the controller 120 may control a cluster to display a warning light depending on whether the vehicle 10 is abnormal based on an abnormal signal detected by various sensors of the vehicle 10.

The controller 120 may include at least one memory storing a program performing the aforementioned operations or operations to be described later and at least one processor implementing a stored program. When the controller 120 includes a plurality of memories and a plurality of processors, the plurality of memories and the plurality of processors may be integrated into one chip or may be physically separated.

According to an embodiment, the storage 130 may store various information required for control. For example, the storage 130 may store a database for abnormal signals for displaying a warning light, a database for the additional notification scenario, a database for the dialogue scenario, a neural network for speech intention analysis, and the like. To this end, the storage 130 may be provided as a known type of storage medium.

According to an embodiment, the communicator 140 may transmit and receive data through wireless communication with an external electronic device. For example, the communicator 140 may transmit data for vehicle inspection reservation, SOS call connection, roadside assistance call, etc., to perform the dialogue processing scenario under control of the controller 120. To this end, the communicator 140 may be provided as a known type of wireless communication module.

Configurations of the vehicle 10 have been described above. Hereinafter, operations of performing a dialogue processing scenario based on a driver's speech by the vehicle 10 are described in detail.

Figure 2:
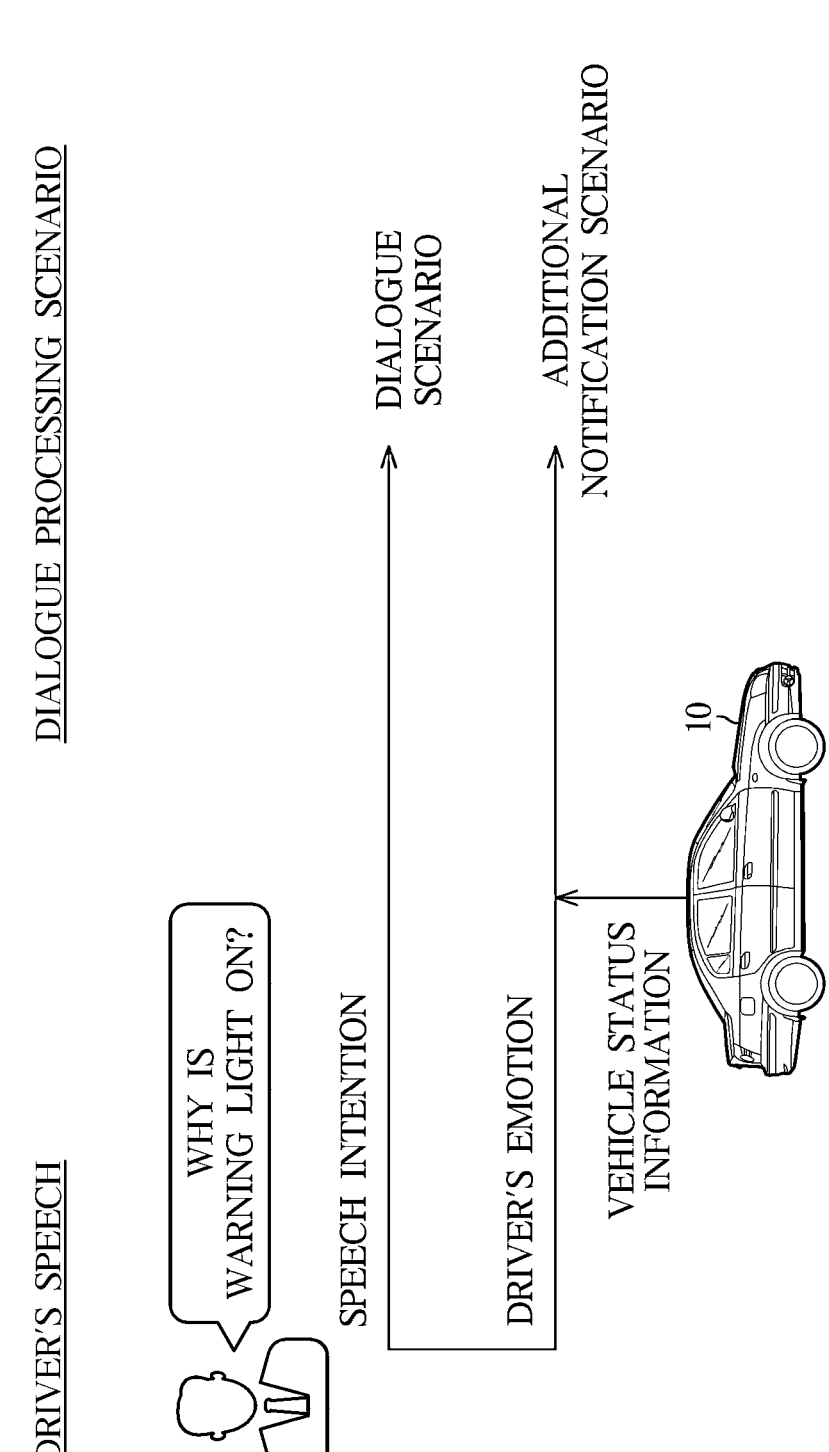
FIG. 2 is a diagram illustrating an example where a vehicle according to an embodiment determines a dialogue processing scenario based on a driver's speech.

FIG. 2 is a diagram illustrating an example where the vehicle 10 according to an embodiment determines a dialogue processing scenario based on a driver's speech.

Referring to FIG. 2, the vehicle 10 according to an embodiment may determine an intention of a driver's speech and a driver's emotion based on the driver's speech input through the user interface 110. In this instance, the driver's emotion may indicate excitement level of the driver.

Also, according to an embodiment, the vehicle 10 according to an embodiment may determine vehicle status information based on at least one of a warning light status or a driving status. In this instance, the vehicle status information may indicate a risk level of current status of the vehicle 10.

According to an embodiment, the vehicle 10 according to an embodiment may determine the dialogue processing scenario based on the intention of the driver's speech, the driver's emotion and the vehicle status information, and control to perform the dialogue processing scenario.

In this instance, the dialogue processing scenario may include a dialogue scenario corresponding to the intention of the driver's speech, and an additional notification scenario corresponding to the driver's emotion and the vehicle status information.

The dialogue scenario may be a speech scenario for response to the intention of the driver's speech, and the additional notification scenario may be a scenario for additionally informing a vehicle status by further considering the driver's emotion and the vehicle status information.

For example, the additional notification scenario may include at least one of a warning voice message output, a vehicle inspection reservation, an SOS call connection, a roadside assistance call or an emergency light on (an emergency light that is turned on).

That is, the vehicle 10 may determine the dialogue scenario corresponding to the intention of the driver's speech and determine the additional notification scenario based on the driver's emotion and the vehicle status information.

Hereinafter, operations of determining the dialogue scenario and the additional notification scenario based on the driver's speech by the vehicle 10 are described in detail.

FIG. 3 is a diagram illustrating an example where the vehicle 10 according to an embodiment determines a driver's speech intention based on a driver's speech. FIG. 4 is a diagram illustrating an example where the vehicle 10 according to an embodiment determines a driver's emotion based on a driver's speech. FIG. 5 is a diagram illustrating an example where the vehicle 10 according to an embodiment performs a dialogue scenario and starts an operation.

Referring to FIG. 3, the vehicle 10 according to an embodiment may determine an intention of a driver's speech based on an output of a neural network for a text of the driver's speech.

Specifically, the vehicle 10 may determine the text of the driver's speech by applying a known type of natural language processing algorithm to the driver's speech input through the user interface 110.

Also, the vehicle 10 may input the determined text to a pre-stored neural network and acquire the intention of the driver's speech as an output of the neural network. In this instance, the neural network may be trained by the learning data based on the driver's speech text as input and the driver's speech intention as output, and a type of neural network is not limited.

For example, as shown in FIG. 3, the driver's speech intention may include a daily dialogue, vehicle status check, checking what a warning light is for, warning light status check, defect status check, and the like.

In this instance, the vehicle 10 may determine a dialogue scenario corresponding to the driver's speech intention, and control the user interface 110 to perform the dialogue scenario, and also the user interface 110 may output a response voice corresponding to the driver's speech intention. In this case, the vehicle 10 may determine the dialogue scenario corresponding to the driver's speech intention using information about a dialogue scenario for each speech intention stored in the storage 130.

In addition, as shown in FIG. 4, the vehicle 10 may determine a driver's emotion based on a speech waveform of the driver's speech. In this instance, the driver's emotion may be classified by an excitement level. Specifically, when the driver is calm, the excitement level may be the lowest, when the driver feels uncomfortable or offended, the excitement level may be medium, and when the driver is astounded, the excitement level may be the highest. The vehicle 10 may determine the driver's emotion based on a speech waveform through a known algorithm.

In this instance, as shown in FIG. 5, the dialogue scenario may include performing a basic function (dialogue) of speech recognition, notification of vehicle diagnosis result, warning light notification, defect notification, and the like.

That is, as shown in FIG. 5, the vehicle 10 may control the user interface 110 to perform the dialogue scenario corresponding to the driver's speech intention.

Also, as shown in FIG. 5, the vehicle 10 may determine a first additional notification count value proportional to the excitement level of the driver's emotion.

Specifically, the vehicle 10 may determine the first additional notification count value based on the driver's speech intention and the driver's excitement level, and determine a higher first additional notification count value, as a severity of the speech intention and the excitement level increase.

Through the above, as the driver's excitement level increases, the vehicle 10 may control at least one of a notification mode, a notification frequency, a level of description or an emergency assistance level of the additional notification scenario to increase.

For example, the vehicle 10 may increase the first additional notification count value by 1, when the driver's excitement level is high due to the driver's astounding emotion in a dialogue scenario for notifying a vehicle diagnosis result, when the driver's excitement level is medium due to the driver's uncomfortable or offended feeling in a dialogue scenario for notifying a defect, when the driver's excitement level is high due to the driver's astounding emotion in a dialogue scenario for notifying a list of warning lights that are on. In addition, the vehicle 10 may increase the first additional notification count value by 2, when the driver's excitement level is high due to the driver's astounding emotion in a dialogue scenario for notifying a defect.

That is, the vehicle 10 may perform the dialogue scenario corresponding to the driver's speech intention, and also determine the first additional notification count value for the additional notification scenario based on the driver's emotion and the dialogue scenario.

Hereinafter, operations of determining vehicle status information and determining an additional notification scenario are described in detail.

FIG. 6 is a diagram illustrating an example where the vehicle 10 according to an embodiment determines a risk level of a warning light status based on a warning light color and the number of warning lights that are on. FIG. 7 is a diagram illustrating an example where the vehicle 10 according to an embodiment determines a driving risk level based on a driving status.

Referring to FIG. 6, the vehicle 10 according to an embodiment may determine a risk level of a warning light status based on a warning light color and the number of warning lights that are on, and determine a second additional notification count value proportional to the risk level of the warning light status.

For example, when one or more orange warning light is on, the vehicle 10 may determine that the risk level of the warning light status corresponds to 2 to 3 and increase the second additional notification count value by 1. Also, when one or more red warning light is on, the vehicle 10 may determine that the risk level of the warning light status corresponds to 4 and increase the second additional notification count value by 2.

Through the above, as the risk level of the warning light status increases, the vehicle 10 may control at least one of a notification mode, a notification frequency, a level of description or an emergency assistance level of the additional notification scenario to increase.

Referring to FIG. 7, the vehicle 10 according to an embodiment may determine a driving risk level based on a driving status of the vehicle 10 and determine a third additional notification count value proportional to the driving risk level.

For example, the vehicle 10 may determine the driving risk level based on whether the vehicle 10 is travelling and whether an emergency light is on. That is, the vehicle 10 may determine that the driving risk level is 2 when the emergency light is on while stopped, determine that the driving risk level is 3 when the vehicle 10 is travelling, and determine that the driving risk level is 4 when the emergency light is on while travelling.

When the driving risk level is 2 or 3, the vehicle 10 may increase the third additional notification count value by 1, and when the driving risk level is 4, the vehicle may increase the third additional notification count value by 2.

Through the above, as the driving risk level increases, the vehicle 10 may control at least one of a notification mode, a notification frequency, a level of description or an emergency assistance level of the additional notification scenario to increase.

FIG. 8 is a diagram illustrating an example where the vehicle 10 according to an embodiment determines an additional notification scenario according to a sum of additional notification counts and a dialogue scenario.

Referring to FIG. 8, the vehicle 10 according to an embodiment may determine an additional notification scenario based on at least one of a dialogue scenario, an excitement level of a driver, a risk level of a warning light status, or a driving risk level.

For example, the vehicle 10 may determine the additional notification scenario based on a sum of a first additional notification count value proportional to the driver's excitement level, a second additional notification count value proportional to the risk level of the warning light status, and a third additional notification count value proportional to the driving risk level.

Specifically, as the sum of count values increases, the vehicle 10 may control at least one of a notification mode, a notification frequency, a level of description or an emergency assistance level of the additional notification scenario to increase.

For example, as shown in FIG. 8, as the sum of additional notification count values increases in dialogue scenarios of 'no operation' and 'performing a basic function (dialogue) of speech recognition', the vehicle 10 may determine the additional notification scenario in an order of warning, vehicle inspection reservation, and SOS call connection.

Also, as shown in FIG. 8, as the sum of additional notification count values increases in dialogue scenarios of 'notification of vehicle diagnosis result' and 'warning light notification', the vehicle 10 may determine the additional notification scenario in an order of vehicle inspection reservation, SOS call connection, and roadside assistance call.

In addition, as shown in FIG. 8, as the sum of additional notification count values increases in a dialogue scenario of 'defect notification', the vehicle 10 may determine the additional notification scenario in an order of SOS call connection, roadside assistance call, and emergency light on (an emergency light that is turned on) and warning.

FIG. 9 is a diagram illustrating an example where the vehicle 10 according to an embodiment determines a dialogue processing scenario. FIGS. 10 to 13 are diagrams illustrating examples where the vehicle 10 according to an embodiment performs a dialogue processing scenario.

Referring to FIG. 9, as at least one of an excitement level of a driver, a risk level of the warning light status, or a driving risk level increases, the vehicle 10 according to an embodiment may control at least one of a notification mode, a notification frequency, a level of description or an emergency assistance level of an additional notification scenario to increase.

For example, the vehicle 10 may control the emergency assistance level of the additional notification scenario to increase, as the driver's excitement level and a risk class of the warning light (color) increase. In this instance, the emergency assistance may be subdivided into normal, caution, warning, and emergency levels. A vehicle inspection reservation may be performed in case of 'caution', a vehicle inspection reservation and a roadside assistance call may be performed in case of 'warning', and an SOS call and roadside assistance call may be performed in case of 'emergency'.

Also, the vehicle 10 may control the notification mode of the additional notification scenario to increase in proportion to the driver's excitement level and the risk level of the warning light status (determined by the risk class of warning light and the number of warning lights that are on). For example, the notification mode may be divided into five levels based on the driver's excitement level and the risk level of the warning light status. In this instance, as shown in FIG. 9, the notification mode may be added, as the level increases.

In addition, the vehicle 10 may control the notification frequency, notification channel and level of description of the additional notification scenario to increase, in proportion to the driver's excitement level and at least one of the number of warning lights that are on, the cumulative numbers of warning lights that are on, or the repetition number of user queries.

Figure 10:
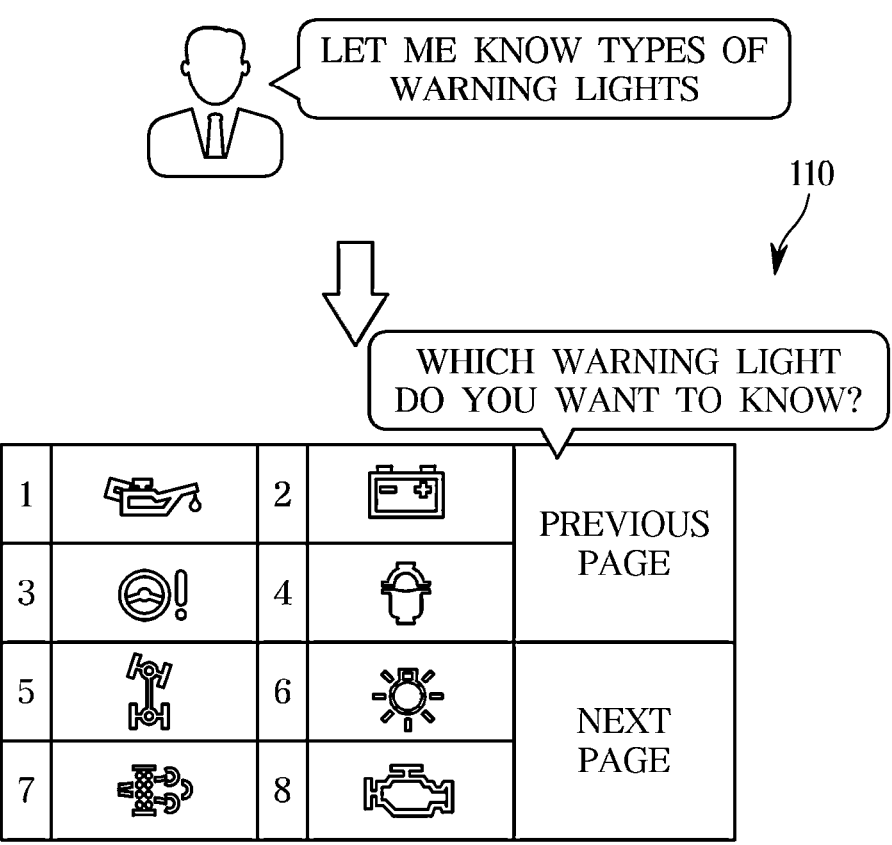

For example, as shown in FIG. 10, when a driver inquires about types of warning lights, the vehicle 10 may determine a driver's speech intention of 'checking what the warning light is for', determine a dialogue scenario, and determine an additional notification scenario based on a driver's excitement level and vehicle status information.

When the vehicle status information is normal and the driver's excitement level is low, the vehicle 10 may control the user interface 110 to perform, as a simple notification, a dialogue scenario corresponding to the driver's speech intention of 'checking what the warning light is for', as shown in FIG. 10. In this case, the user interface 110 may display the types of warning lights and output an utterance for specifying a warning light type.

Figure 11:
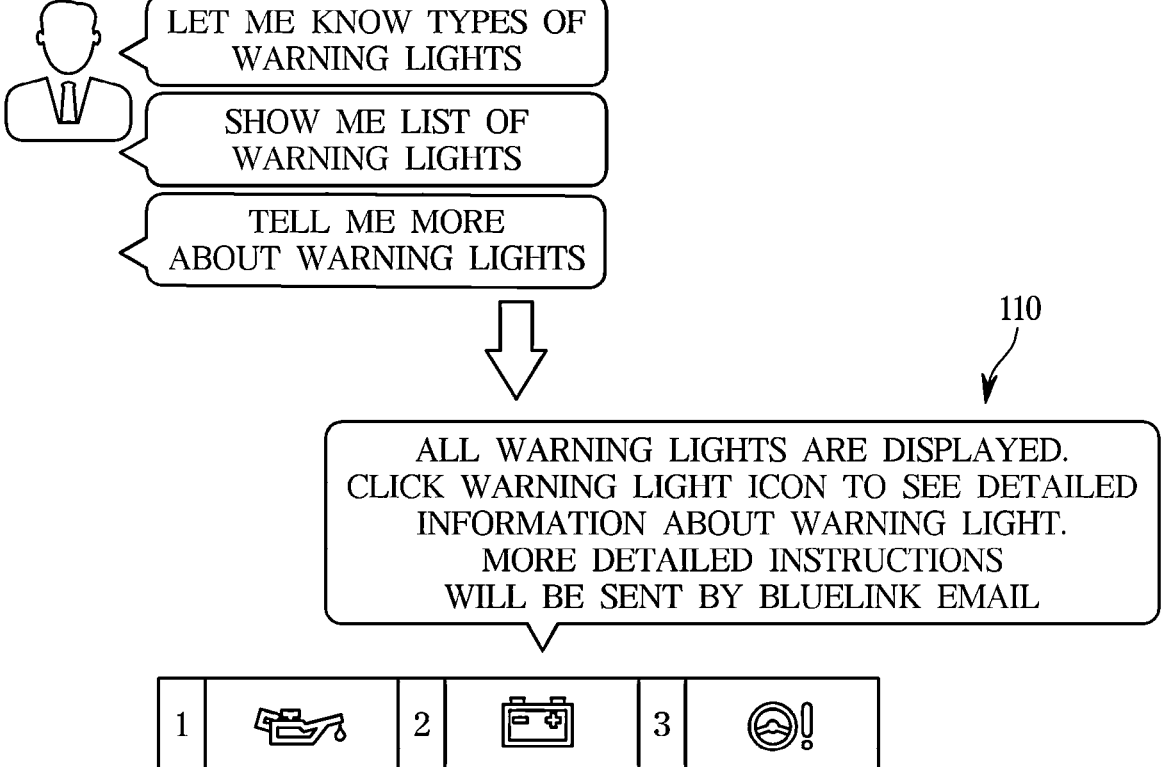

In addition, as shown in FIG. 11, as the repetition number of user queries increases, the vehicle 10 may control the level of description of the dialogue processing scenario and the notification channel to increase. For example, when the repetition number of user queries on warning lights increases, the vehicle 10 may determine a dialogue processing scenario to explain warning lights in greater detail, control the user interface 110 to perform the dialogue processing scenario, and add an e-mail to the notification channel.

Figure 12:
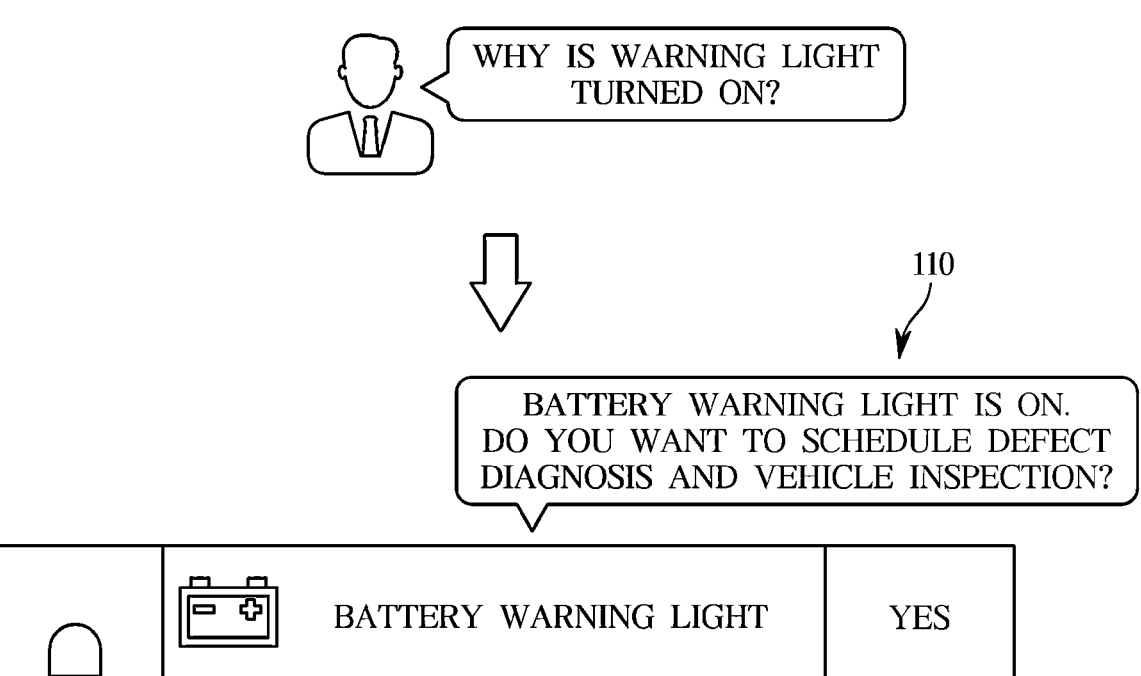

Further, as shown in FIG. 12, when the warning light is displayed and the risk level of the warning light status increases, the vehicle 10 may control the user interface 110 to display a warning pop-up according to the additional notification scenario, and also control the user interface 110 to output a voice inducing a vehicle inspection reservation.

Moreover, as shown in FIG. 13, when receiving a driver's speech whose intention is 'checking a defect' (e.g. smoke comes from an engine), the vehicle 10 may control the user interface 110 to perform a dialogue scenario corresponding to the driver's speech intention of 'checking a defect' and also perform an additional notification scenario such as roadside assistance call, SOS call, and the like. That is, in a status where the driver's speech intention is 'checking a defect' and a driver's excitement level is high, and based on vehicle status information, the vehicle 10 may control the user interface 110 to perform the dialogue scenario corresponding to the driver's speech intention of 'checking a defect' as well as perform the additional notification scenario such as roadside assistance call, SOS call, and the like. In this instance, the vehicle 10 may control the notification mode of the additional notification scenario to increase, and control the repetition numbers of notifications to increase.

Hereinafter, a control method of the vehicle 10 according to an embodiment is described. The aforementioned vehicle 10 according to an embodiment is applicable to the control method of the vehicle 10. Accordingly, a description made with reference to FIGS. 1 to 13 may be equally applied to the control method of the vehicle 10 according to an embodiment, even when not specifically described below.

Figure 14:
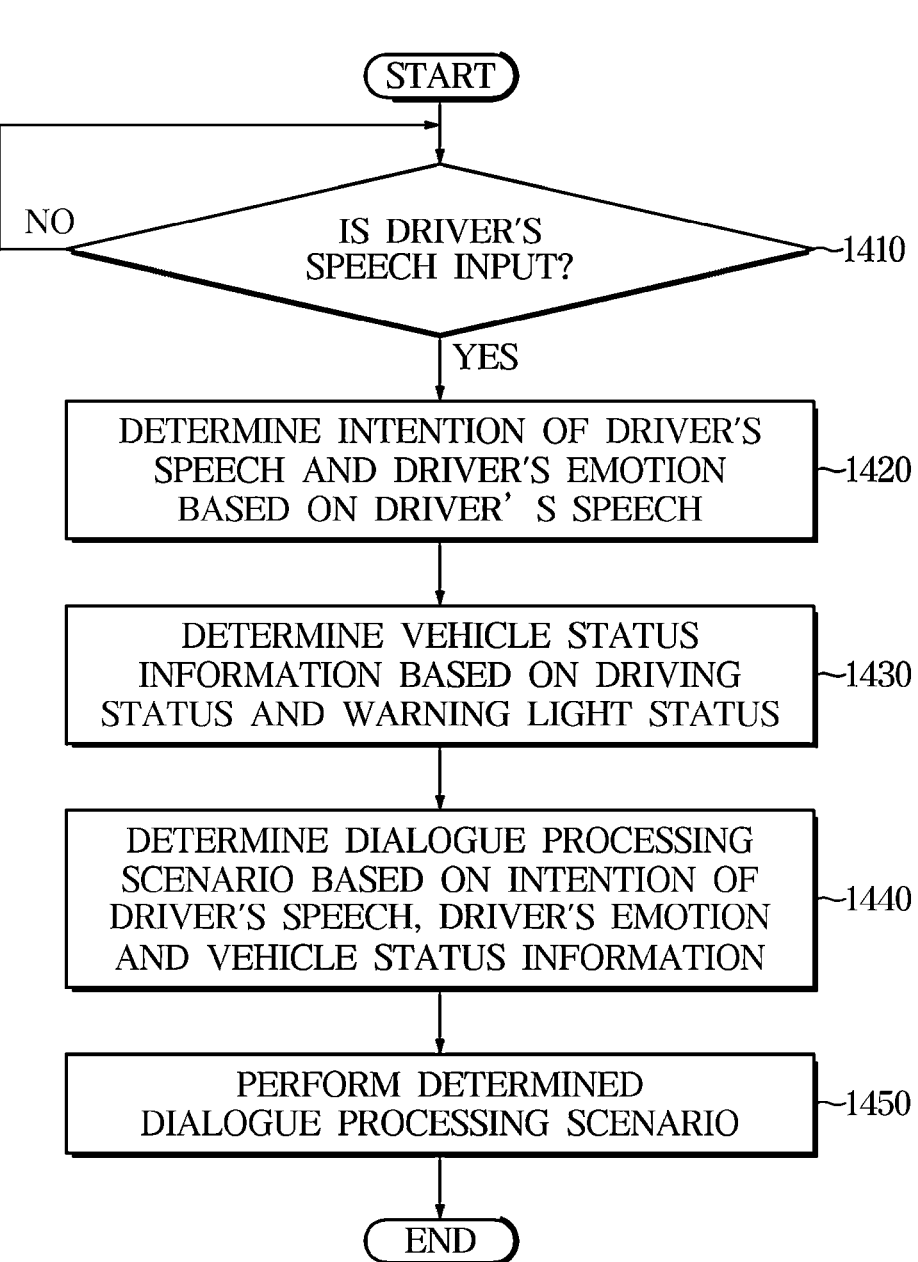
FIG. 14 is a flowchart illustrating operations of determining and performing a dialogue processing scenario by a vehicle based on a driver's speech, in a control method of a vehicle according to an embodiment.

FIG. 14 is a flowchart illustrating operations of determining and performing a dialogue processing scenario by the vehicle 10 based on a driver's speech, in a control method of a vehicle according to an embodiment.

Referring to FIG. 14, when a driver's speech is input (Yes in operation 1410), the vehicle 10 according to an embodiment may determine an intention of the driver's speech and a driver's emotion based on the driver's speech (1420).

Specifically, the vehicle 10 may determine a text of the driver's speech by applying a known type of natural language processing algorithm to the driver's speech input through the user interface 110.

Also, the vehicle 10 may input the determined text to a pre-stored neural network and acquire the intention of the driver's speech as an output of the neural network.

Further, the vehicle 10 may determine the driver's emotion based on a speech waveform of the driver's speech.

According to an embodiment, the vehicle 10 may determine vehicle status information based on a driving status and a warning light status (1430).

Specifically, the vehicle 10 may determine a risk level of the warning light status based on a warning light color and the number of warning lights that are on.

Also, the vehicle 10 may determine a driving risk level according to the driving status of the vehicle 10. For example, the vehicle 10 may determine the driving risk level based on whether the vehicle 10 is travelling and whether an emergency light is on.

According to an embodiment, the vehicle 10 may determine a dialogue processing scenario based on the intention of the driver's speech, the driver's emotion and the vehicle status information (1440), and perform the determined dialogue processing scenario (1450).

In this instance, the dialogue processing scenario may include a dialogue scenario corresponding to the intention of the driver's speech, and an additional notification scenario corresponding to the driver's emotion and the vehicle status information.

The dialogue scenario may be a speech scenario for response to the intention of the driver's speech, and the additional notification scenario may be a scenario for additionally informing a vehicle status by further considering the driver's emotion and the vehicle status information.

For example, the additional notification scenario may include at least one of a warning voice message output, a vehicle inspection reservation, an SOS call connection, a roadside assistance call or an emergency light on (an emergency light that is turned on).

That is, the vehicle 10 may determine the dialogue scenario corresponding to the intention of the driver's speech and determine the additional notification scenario corresponding to the driver's emotion and the vehicle status information.

As is apparent from the above, according to the embodiments of the disclosure, when processing a driver's speech and providing a dialogue processing scenario corresponding to the processed speech, the vehicle and the control method thereof can determine the dialogue processing scenario by considering driver's emotions and a vehicle status, thereby providing an optimal dialogue processing scenario.

Embodiments can thus be implemented in the form of a recording medium storing computer-executable instructions that are executable by a processor. The instructions may be stored in the form of a program code, and when executed by a processor, the instructions may generate a program module to perform operations of the disclosed embodiments. The recording medium may be implemented non-transitory as a computer-readable recording medium.

The computer-readable code can be recorded on a medium or transmitted through the Internet. The medium may include read only memory (ROM), random access memory (RAM), magnetic tapes, magnetic disks, flash memories, and optical recording medium.

Although embodiments have been described for illustrative purposes, those skilled in the art will appreciate that various modifications, additions and substitutions are possible, without departing from the scope and spirit of the disclosure. Therefore, embodiments have not been described for limiting purposes.

What is claimed is:

1. A vehicle, comprising:

a user interface; and at least one processor configured to control the user interface, wherein the at least one processor is configured to:

determine an intention of a speech of a driver of the vehicle and an emotion of the driver based on the driver's speech input through the user interface;

determine vehicle status information of the vehicle based on a driving status and a warning light status;

determine a dialogue processing scenario based on the intention of the driver's speech, the driver's emotion and the vehicle status information; and control to perform the dialogue processing scenario to output, in response to the intention of the driver's speech, a voice based on a dialogue scenario and information based on an additional notification scenario through the user interface, wherein the dialogue processing scenario comprises:

the dialogue scenario corresponding to the intention of the driver's speech; and the additional notification scenario corresponding to the driver's emotion and the vehicle status information, wherein the at least one processor is configured to:

determine the additional notification scenario based on the dialogue scenario, an excitement level of the driver, a risk level of the warning light status and a driving risk level, and determine the additional notification scenario, based on a sum of a first additional notification count value proportional to the excitement level of the driver, a second additional notification count value proportional to the risk level of the warning light status, and a third additional notification count value proportional to the driving risk level.

2. The vehicle of claim 1, wherein the at least one processor is configured to determine the intention of the driver's speech based on an output of a neural network for a text of the driver's speech, and determine the driver's emotion based on a speech waveform of the driver's speech.

3. The vehicle of claim 2, wherein the at least one processor is configured to control at least one of a notification mode, a notification frequency, and a level of description or an emergency assistance level of the additional notification scenario to increase, as the excitement level of the driver increases.

4. The vehicle of claim 1, wherein the at least one processor is configured to determine the risk level of the warning light status based on a warning light color and a number of warning lights that are on, and control at least one of a notification mode, a notification frequency, a level of description or an emergency assistance level of the additional notification scenario to increase, as the risk level of the warning light status increases.

5. The vehicle of claim 1, wherein the at least one processor is configured to determine the driving risk level based on the driving status and whether an emergency light is on, and control at least one of a notification mode, a notification frequency, a level of description or an emergency assistance level of the additional notification scenario to increase, as the driving risk level increases.

6. The vehicle of claim 1, wherein the at least one processor is configured to control at least one of a notification mode, a notification frequency, a level of description or an emergency assistance level of the additional notification scenario to increase, as the sum increases.

7. The vehicle of claim 1, wherein the additional notification scenario comprises at least one of a warning voice message output, a vehicle inspection reservation, an SOS call connection, a roadside assistance call or an emergency light that is turned on.

8. A method to control a vehicle comprising a user interface, the method comprising:

determining, by at least one processor, an intention of a speech of a driver of the vehicle and an emotion of the driver based on the driver's speech input through the user interface;

determining, by the at least one processor, vehicle status information of the vehicle based on a driving status and a warning light status;

determining, by the at least one processor, a dialogue processing scenario based on the intention of the driver's speech, the driver's emotion and the vehicle status information; and controlling, by the at least one processor, the user interface to perform the dialogue processing scenario to output, in response to the intention of the driver's speech, a voice based on a dialogue scenario and information based on an additional notification scenario through the user interface, wherein the dialogue processing scenario comprises:

the dialogue scenario corresponding to the intention of the driver's speech; and the additional notification scenario corresponding to the driver's emotion and the vehicle status information, wherein the determining of the dialogue processing scenario comprises:

determining, by the at least one processor, the additional notification scenario based on the dialogue scenario, an excitement level of the driver, a risk level of the warning light status and a driving risk level; and determining, by the at least one processor, the additional notification scenario, based on a sum of a first additional notification count value proportional to the excitement level of the driver, a second additional notification count value proportional to the risk level of the warning light status, and a third additional notification count value proportional to the driving risk level.

9. The method of claim 8, wherein the determining of the intention of the driver's speech and the driver's emotion comprises determining, by the at least one processor, the intention of the driver's speech based on an output of a neural network for a text of the driver's speech, and determining, by the at least one processor, the driver's emotion based on a speech waveform of the driver's speech.

10. The method of claim 9, wherein the determining of the dialogue processing scenario comprises controlling, by the at least one processor, at least one of a notification mode, a notification frequency, a level of description or an emergency assistance level of the additional notification scenario to increase, as the excitement level of the driver increases.

11. The method of claim 8, wherein the determining of the dialogue processing scenario comprises determining, by the at least one processor, the risk level of the warning light status based on a warning light color and a number of warning lights that are on, and controlling at least one of a notification mode, a notification frequency, a level of description or an emergency assistance level of the additional notification scenario to increase, as the risk level of the warning light status increases.

12. The method of claim 8, wherein the determining of the dialogue processing scenario comprises determining, by the at least one processor, the driving risk level based on the driving status and whether an emergency light is on, and controlling at least one of a notification mode, a notification frequency, a level of description or an emergency assistance level of the additional notification scenario to increase, as the driving risk level increases.

13. The method of claim 8, wherein the determining of the dialogue processing scenario comprises controlling, by the at least one processor, at least one of a notification mode, a notification frequency, a level of description or an emergency assistance level of the additional notification scenario to increase, as the sum increases.

14. The method of claim 8, wherein the additional notification scenario comprises at least one of a warning voice message output, a vehicle inspection reservation, an SOS call connection, a roadside assistance call or an emergency light that is turned on.

* * * * *